United States Patent [19]

Izumitani et al.

[11] 4,043,852

[45] Aug. 23, 1977

[54] ANOMALOUS DISPERSION GLASS EXHIBITING THE ANOMALOUS PARTIALLY DISPERSING PROPERTY IN THE LONG WAVE LENGTH REGION

[75] Inventors: Tetsuro Izumitani, Hino; Yasuo Fukuoka, Akishima; Toshiharu Yamashita, Hachioji, all of Japan

[73] Assignee: Hoya Glass Works, Ltd., Tokyo, Japan

[21] Appl. No.: 712,617

[22] Filed: Aug. 9, 1976

Related U.S. Application Data

[63] Continuation-in-part of Ser. No. 526,996, Nov. 25, 1974, abandoned, which is a continuation-in-part of Ser. No. 316,607, Dec. 19, 1972, abandoned.

[30] Foreign Application Priority Data

Dec. 20, 1971 Japan ................................ 46-103521

[51] Int. Cl.² .......................... C03C 3/08; C03C 3/10; C03C 3/30
[52] U.S. Cl. ................................. 106/53; 106/47 Q; 106/54
[58] Field of Search .......................... 106/53, 54, 47 Q

[56] References Cited

U.S. PATENT DOCUMENTS

| | | | |
|---|---|---|---|
| 2,393,448 | 1/1946 | Arnistead | 106/53 |
| 2,511,228 | 6/1950 | Scen et al. | 106/47 Q |
| 3,653,933 | 4/1972 | Tsunekawa | 106/53 |
| 3,682,840 | 8/1972 | Van Loa | 106/53 |
| 3,834,913 | 9/1974 | Asahana et al. | 106/53 |

FOREIGN PATENT DOCUMENTS 452,311  9/1966  Japan ................................ 106/47 Q

*Primary Examiner*—Winston A. Douglas
*Assistant Examiner*—Mark Bell
*Attorney, Agent, or Firm*—Sughrue, Rothwell, Mion, Zinn and Macpeak

[57] ABSTRACT

This invention provides an anomalous dispersion glass exhibiting an $\eta$ d value of 1.54–1.71 and an $\nu$ d value of 55–30, and the anomaly of a partially dispersing property in the long wave length region. The anomalous dispersion glass contains $B_2O_3$ 45–70 mol.%; PbO 5–30 mol.%; $Na_2O$ 1–15 mol.%; $SiO_2$ 0–10 mol.%; $Al_2O_3$ 5–25 mol.%; one or more of CaO, BaO, MgO and CdO 0–16 mol.%, and one of $TiO_2$, $ZrO_2$, $Sb_2O_3$, $WO_3$ and $Tl_2O$ 0–3 mol.%. Fluorine may be present in an amount such that the F/O ion ratio in the resulting glass lies in the range of 0–0.35.

7 Claims, 15 Drawing Figures

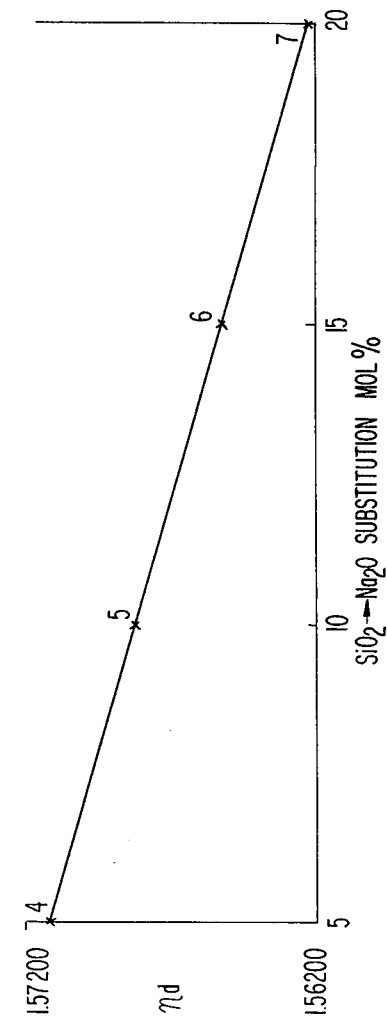
FIG 3a
FIG 3b
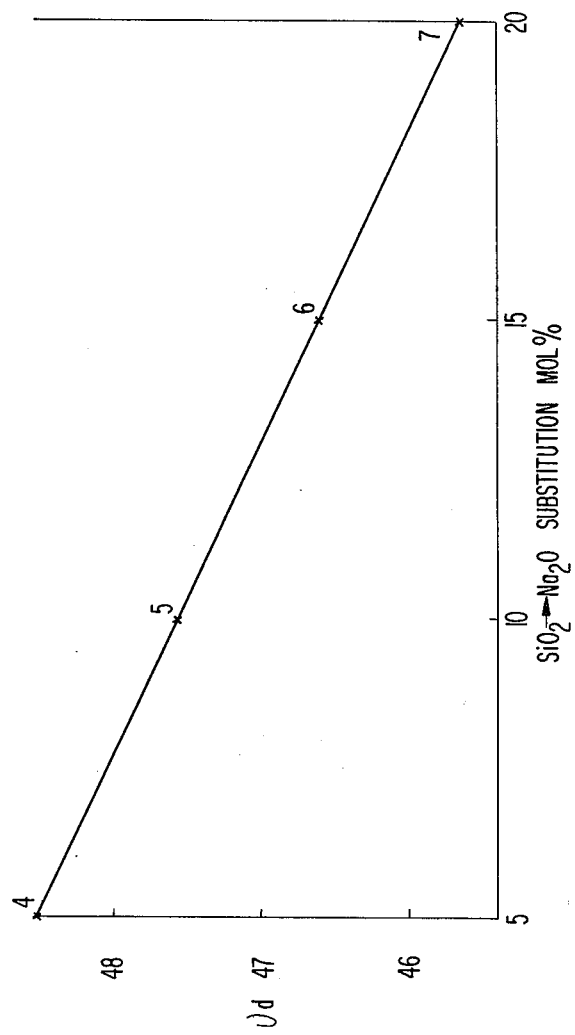
FIG 4a
FIG 4b

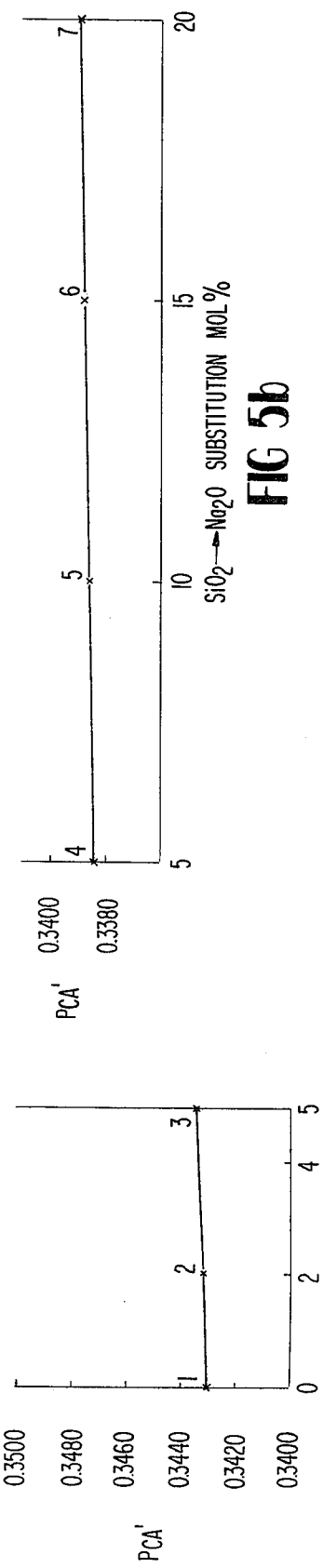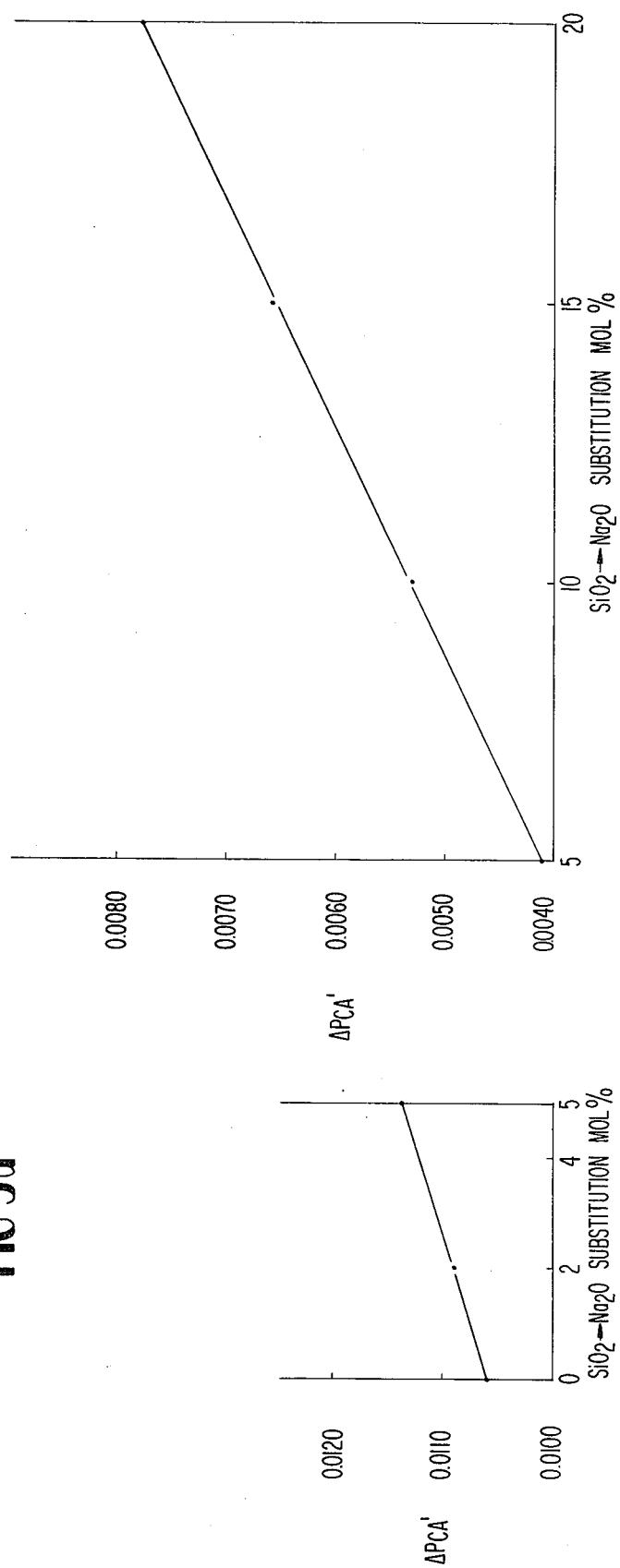

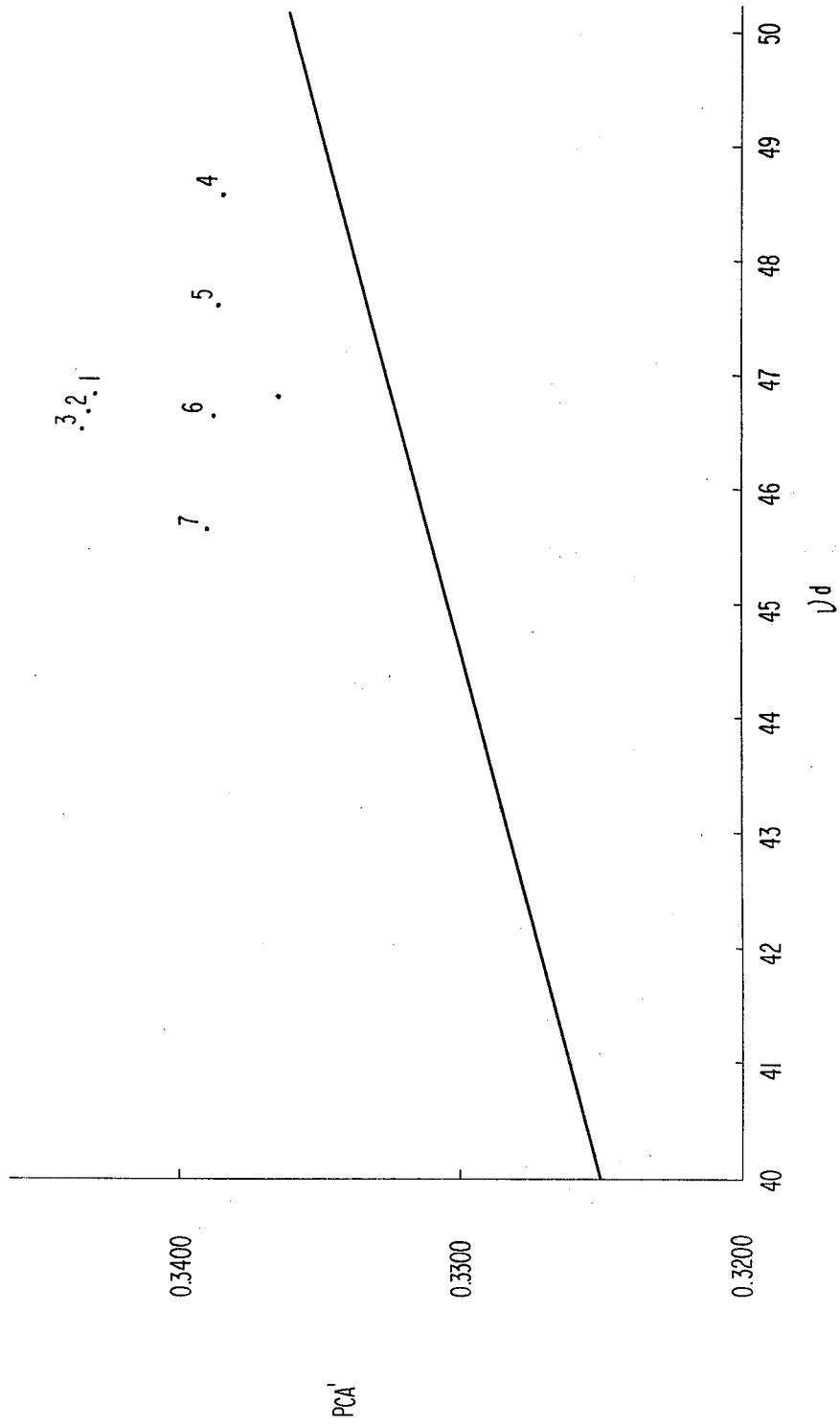

ANOMALOUS DISPERSION GLASS EXHIBITING THE ANOMALOUS PARTIALLY DISPERSING PROPERTY IN THE LONG WAVE LENGTH REGION

CROSS-REFERENCE TO RELATED APPLICATION

This application is a continuation-in-part application of Ser. No. 526,996, filed Nov. 25, 1974, now abandoned, in turn a continuation-in-part application of Ser. No. 316,607, filed Dec. 19, 1972, now abandoned.

BACKGROUND OF THE INVENTION

1. Field of the Invention

This invention relates to an optical glass exhibiting the anomaly of partial dispersing property in a long wave length region, i.e., the wave length region which is longer than the c line (6263 A).

2. Description of the Prior Art

The partial dispersion ration (Pxy) of a glass for light of two different spectral wavelengths $x$ and $y$ is generally indicated by expression (1):

$$Pxy = \frac{\eta x - \eta y}{\eta F - \eta c} \quad (1)$$

which is determined on the basis of the difference in the refractive index $\eta F$ for the 4861 A line and the refractive index $\eta c$ for the 6263 A line. The symbols $\eta x$ and $\eta y$ represent the refractive indices of the light at wavelengths $x$ and $y$, respectively. On the other hand, in normal dispersion glasses expression (2) gives the relationship between the partial dispersion ratio of the normal dispersion glass and the Abbe number ($\nu d$):

$$\nu d = (\eta d - l)(\eta F - \eta c.)$$

$$Pxy = Axy + bxy \cdot \nu d \quad (2)$$

wherein Axy and bxy are constants selected in accordance with the wave length x and y of light, respectively, Axy and bxy being determined by two glasses selected from normal glasses, $\eta d$ indicates the refractive index for the d line (5876 A) and $\eta F$ and $\eta c$ have the same meaning as in expression (1).

When pluralities of such normal dispersion glasses are assembled into e.g., a lens, the chromatic abberation between two lines on a spectrum, for example, between the F line and the C line, can be removed, but the extinction of the secondary spectrum renders super achromatism impossible.

On the other hand, if an anomalous dispersion glass exhibiting the anomaly of partial dispersion in a long wave length region is assembled with another anomalous dispersion glass exhibiting the anomaly of partial dispersion in a short wave length region, super achromatism can be attained over the whole visible light range.

The words "anomalous partial dispersion glass" mean a glass which exhibits a deviation value ($\Delta Pxy$) which is not equal to zero in expression (3) which represents the partial dispersion ration Pxy, wherein $\Delta Pxy$ shows the deviation of the partial dispersion ratio from the straight line of that of a normal dispersion glass and "$\widetilde{P}xy$" is the (relative) partial dispersion of a normal dispersion glass:

$$Pxy = \widetilde{P}xy + \Delta Pxy \quad (3)$$

The value of $\Delta Pxy$ indicates the degree of anomaly of the partial dispersion. It is known that larger $\Delta Pxy$ values result in favorable super achromatism.

In the case that the partial dispersion ratio in a long wave length region is indicated as $$PcA' = \eta c - \eta A'/\eta F - \eta c$$

by selecting the C line of 6263 A and the A' line of 7682 A as $x$ and $y$, respectively, in expression (1), the increase of the PcA' value and the decrease of the Abbe number $\gamma d$ are effective to increase the degree of the anomaly ($\Delta PcA'$). In this formula, PcA'' is the (relative) partial dispersion wherein $x$ equals C and $y$ equals A', $\eta c$ is the refractive index wherein $x$ equals c and $\eta A'$ is the refractive index wherein $y$ equals A'.

Therefore, a conventional anomalous dispersion glass exhibiting the anomaly of partial dispersion in the long wave length region contains $B_2O_3$ as the glass forming oxide since $B_2O_3$ is effective to absorb light in the infrared region and increase the PcA' value, and PbO, which absorbs light in the ultraviolet region and decreases the Abbe number.

SUMMARY OF THE INVENTION

We, the inventors, have discovered that the degree of the anomaly of partial dispersion (in the long wave length region) can be increased by decreasing the specific gravity of an anomalous dispersion glass. The glass of this invention was made based on the this discovery and produced by introducing $Na_2O$ and, optionally, $SiO_2$, which impart a low specific gravity to the resulting glass, into a $B_2O_3$—PbO glass to thereby increase the anomaly of the partial dispersion. In one embodiment, the $Na_2O$ is substituted for a portion of the $B_2O_3$, say of about 15 mol.%, in a conventional $B_2O_3$ — PbO anomalous dispersion glass. However, when this is done, the concentrations in the glass of the conventional ingredients must still remain within the range set forth in the detailed description of the invention hereinbelow.

A first object of this invention is to provide a remarkable anomalous partial dispersion glass in the long wave length region.

A second object of this invention is to provide a stable glass suitable for mass production.

A third object of this invention is to provide a glass which has good resistance to chemicals.

A fourth object of this invention is to select useful components for compensating the refractive index of such a partial anomalous dispersion glass.

A fifth object of this invention is to provide an anomalous partial dispersion glass in the long wave length region which has a low refractive index.

BRIEF DESCRIPTION OF THE DRAWINGS

FIGS. 3a, 3b, 4a, 4b, 5a, 5b, 6, 7a, and 7b show the improved properties achieved with the glass of the present invention when $Na_2O$ is substituted for $SiO_2$.

DETAILED DESCRIPTION OF THE INVENTION

Figure 1:
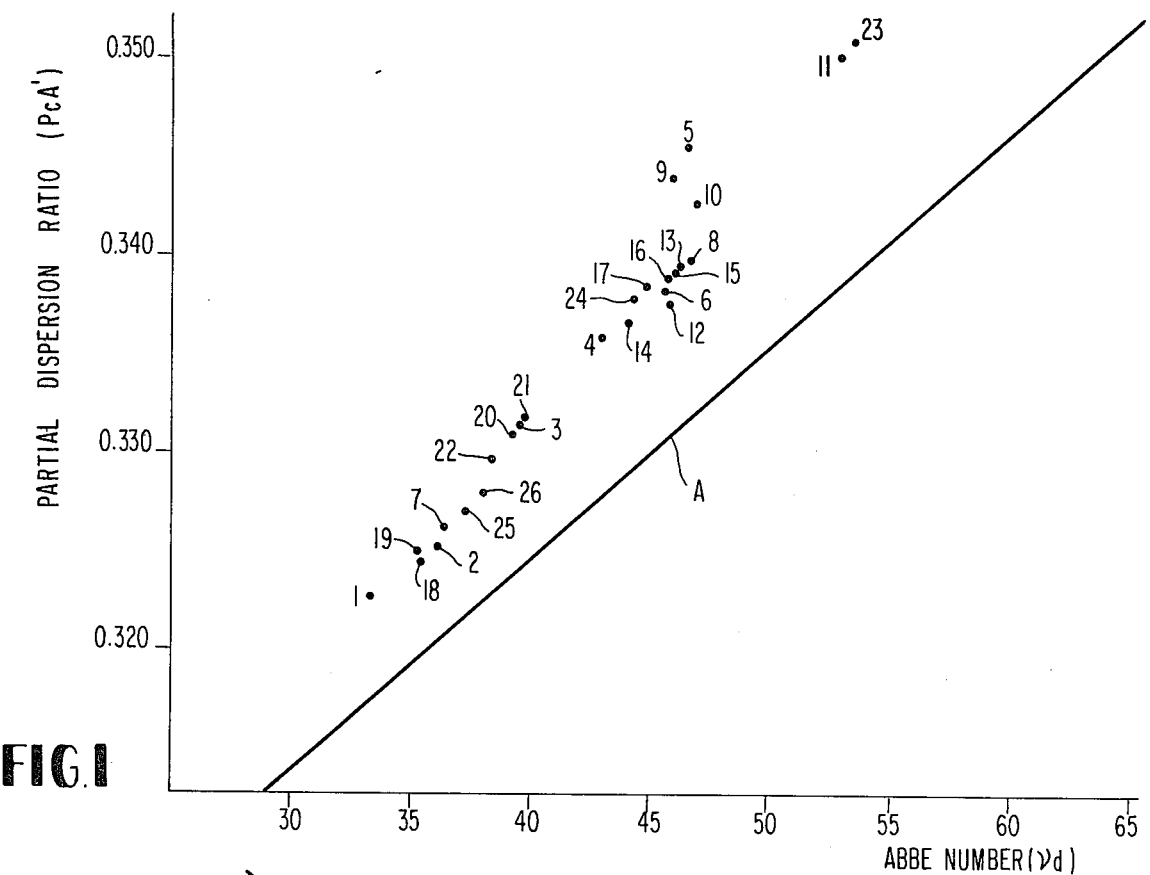
FIG. 1 shows the relationship between the Abbe number ($\nu d$) and the partial dispersion ration (PcA') of an optical glass of this invention showing the anomaly of the partial dispersion in the long wave length region.

The PbO which is introduced into the conventional $B_2O_3$—PbO glass to decrease the Abbe number also increases the partial dispersing ratio in the short wavelength region with increased PbO content in the glass. The increase of the PbO content is restricted since the partial dispersing ratio in the short wavelength region of the anomalous dispersion glass in the long wavelength region must be smaller than that of a normal dispersion glass for super achromatism.

On the other hand, in the case that a light component (such as $Na_2O$ or $SiO_2$) capable of decreasing the specific gravity of the resulting glass is added to the glass composition to lower the Abbe number, the anomaly of the partial dispersion in the long wavelength region can be increased without causing the above defects. Accordingly, the Abbe number can be advantageously reduced by the combined action of PbO and the introduction of the light weight component.

$B_2O_3$—PbO glasses have poor resistance to chemicals, and the addition of $Al_2O_3$ is not completely satisfactory in improving resistance to chemicals, i.e. a $B_2O_3$—PbO—$Al_2O_3$ glass, $B_2O_3$ dissolves in water or an acid and the chemical durability of the glass is dependent on the $B_2O_3$ content. Accordingly, the $B_2O_3$ content in such a glass must be reduced to increase the chemical durability, but a reduction in the $B_2O_3$ content is not favorable for increasing the PcA' value.

However, if $Na_2O$ and, optionally, $SiO_2$ is introduced into such a $B_2O_3$—PbO—$Al_2O_3$ glass according to this invention, the reduction of the PcA' value due to the decrease of the $B_2O_3$ content can be compensated to some extent. In addition, $Na_2O$ is not dissolved in acid or water to an extent as great as $B_2O_3$, and $SiO_2$ improves the chemical durability. Therefore, one major feature of this invention is that the remarkable anomaly of the partial dispersion (in the long wave length region) can be obtained by the addition of $Na_2O$ and, optionally, $SiO_2$.

In addition, the anomalous dispersion glass of this invention has a low refractive index (an $\eta d$ value less than 1.71) due to the $Na_2O$ and, optionally, $SiO_2$.

The PbO content in this glass influences the value of the Abbe number, and serves to improve the acid resistance to an extent comparable with $Al_2O_3$. Therefore, in the case of controlling the Abbe number by decreasing the PbO content, the reduction of the acid resistance can be compensated for the same extent by the addition of CaO, BaO, MgO or CdO. $TiO_2$, $ZrO_2$, $WO_3$, $Sb_2O_3$ or $Tl_2O$ may be introduced into the glass composition to adjust the optical constant.

The partial dispersion ratio PcA' (in the long wave length region) can be increased by replacing a part of oxygen ions in the glass with F ions, i.e. F ions can be introduced into the glass by replacing a part of the oxide components with fluorides.

The anomalous dispersion glass of this invention was developed based on the above empirical work, and contains $B_2O_3$ 45–70 mol.%; PbO 5–30 mol.%; $Na_2O$ 1–15 mol.%; $SiO_2$ 0–10 mol.%; $Al_2O_3$ 5–25 mol.%; one or more of CaO, BaO, MgO and CdO 0–16 mol.%; and any one of $TiO_2$, $ZrO_2$, $WO_3$, $Sb_2O_3$ and $Tl_2O$ 0–3 mol.%, in which a part of the oxide components may be replaced with fluorides so that the F/O ratio (ion ratio) in the resulting glass composition lies in the range of 0–0.35. The F/O ratio means $$\frac{\text{Ionic percent of F in glass}}{\text{Ionic percent of O in glass}}, \text{ that is}, \frac{\text{Number of F ions in glass}}{\text{Number of O ions in glass}}.$$

This glass exhibits the anomaly of partial dispersion (in the long wave length region) and has an $\eta d$ value of 1.54–1.71 and a $\nu d$ value of 55–30. 1–12 mol.% of CaO is especially effective to improve the acid resistance of the glass but any one component selected from the group of $TiO_2$, $Tl_2O$ 0.5–3 mol.% is effective to adjust the optical constant.

The content of each component is set to be within the above restricted ranges for the following reasons.

The addition of less than 45 mol.% of $B_2O_3$ makes the resulting glass unstable and does not provide the anomaly of partial dispersion in the long wave length region, whereas the addition of more than 70% of $B_2O_3$ is detrimental to the chemical durability of the glass.

The addition of more than 10 mol.% of $SiO_2$ elevates the liquidus temperature of the resulting glass and makes the glass unstable.

The addition of more than 15 mol.% of $Na_2O$ worsens the chemical durability of the resulting glass, and once worsened, the chemical durability cannot be restored.

The sum of $Na_2O$ and $SiO_2$ must exceed 1% to increase the anomaly of the partial dispersion in the long wave length region, and the upper limit is restricted by the maximum content of $Na_2O$ and $SiO_2$.

Less than 5 mol.% of $Al_2O_3$ makes the resulting glass unstable and more than 25 mol.% of $Al_2O_3$ causes insoluble matter in the glass.

Excess amounts of CaO, BaO, MgO and CdO elevate the liquidus temperature of the glass and make the glass unstable.

The addition of excess amounts of $TiO_2$, $ZrO_2$, $WO_3$ or $Sb_2O_3$ makes the glass unstable and devitrifies the glass. Too much $Tl_2O$ is detrimental to the chemical durability of the glass.

PbO is added to the glass composition in an amount of 5–30 mol.% as a balancing component, i.e., to make 100%.

The introduction of excess amounts of F causes opaque matter in the glass due to the precipitation of fluoride crystals. In order to mass produce the glass of the present invention a preferred composition consists of 53–57 mol.% of $B_2O_3$, 5–29 mol.% of PbO, 3.5–7.5 mol.% of $Na_2O$, 0–4 mol.% of $SiO_2$, 10.5–17.5 mol.% of $AlO_3$ and 0–12 mol.% of CaO.

Some examples of glasses within this invention will now be explained with reference to Tables and the drawings.

The partial dispersion ratio of the glass in the long wave length region is indicated as PcA' as described hereinbefore, whereas that in the short wave length region is indicated as $Phg (= \eta h - \eta g / \eta F - \eta c)$ by selectingan h line of 4047 A and a g line of 4358 A as $x$ and $y$, respectively, in expression (1).

The acid resistance of the glass was tested to examine the chemical durability in the following manner:

Samples (1–26) of glasses were finely ground into a size of 28–35 mesh, and the resultant glass particles were washed with ethanol, dried and charged in a platinum cage with a specific gravity gram which was then dipped in 150 cc of a hot nitric acid solution [pH of 2.20] and heated over boiling water for 1 hr, removed and then fully dried.

Thereafter, the weight loss of each glass sample was measured.

The test results are shown in the following Tables:

Table 1

|  | 1 | 2 | 3 | 4 | 5 | 6 |
|---|---|---|---|---|---|---|
| $B_2O_3$ | 53 mol.% | 57 | 57 | 57 | 70 | 50 |
| PbO | 29 mol.% | 25 | 20 | 15 | 12.5 | 10 |
| $Na_2O$ | 7.5 mol.% | 7.5 | 7.5 | 7.5 | 2 | 15 |
| $Al_2O_3$ | 10.5 mol.% | 10.5 | 15.5 | 17.5 | 12.5 | 20 |
| CaO | — | — | — | 3 | 3 | 5 |
| $\eta d$ | 1.70130 | 1.67216 | 1.63648 | 1.61067 | 1.59314 | 1.57797 |
| $\nu d$ | 33.43 | 36.20 | 39.66 | 43.10 | 46.70 | 45.76 |
| PcA' | 0.3227 | 0.3253 | 0.3315 | 0.3359 | 0.3457 | 0.3381 |
| Phg | 0.5110 | 0.5003 | 0.4891 | 0.4799 | 0.4661 | 0.4751 |
| Specific Gravity | 4.06 | 3.79 | 3.45 | 3.17 | 2.94 | 2.89 |
| Weight less by acid(%) | — | 1.48 | 1.58 | 1.75 | 4.36 | 3.25 |

Table 2

|  | 7 | 8 | 9 | 10 | 11 |
|---|---|---|---|---|---|
| $B_2O_3$ | 60 | 47 | 70 | 57 | 56 |
| PbO | 25 | 10 | 12.5 | 10 | 5 |
| $Na_2O$ | 7.5 | 13 | — | 3.5 | 5.5 |
| $Al_2O_3$ | 7.5 | 20 | 12.5 | 17.5 | 17.5 |
| $SiO_2$ | — | 10 | 5 | 3 | 4 |
| CaO | — | — | — | 9 | 12 |
| $\eta d$ | 1.67320 | 1.56420 | 1.58221 | 1.59292 | 1.56470 |
| $\nu d$ | 36.47 | 46.69 | 46.04 | 47.70 | 53.02 |
| PcA' | 0.3262 | 0.3398 | 0.3441 | 0.3427 | 0.3502 |
| Phg | 0.4967 | 0.4705 | 0.4654 | 0.4674 | 0.4563 |
| specific gravity | 3.80 | — | 2.88 | 2.92 | 2.66 |
| weight loss by acid (%) | 2.78 | — | — | 1.77 | 1.88 |

Table 3

|  | 12 | 13 | 14 | 15 | 16 | 17 |
|---|---|---|---|---|---|---|
| $B_2O_3$ | 50 | 50 | 50 | 50 | 50 | 50 |
| PbO | 10 | 10 | 10 | 10 | 10 | 10 |
| $Na_2O$ | 8 | 8 | 5 | 10 | 10 | 10 |
| $Al_2O_3$ | 20 | 20 | 20 | 20 | 20 | 20 |
| CaO | — | — | — | 2 | — | 2 |
| BaO | 12 | — | — | — | — | — |
| MgO | — | 12 | — | 8 | 8 | — |
| CdO | — | — | 15 | — | 2 | 8 |
| $\eta d$ | 1.60112 | 1.59410 | 1.63335 | 1.58788 | 1.59133 | 1.60490 |
| $\nu d$ | 45.92 | 46.28 | 44.14 | 46.22 | 45.91 | 44.87 |
| PcA' | 0.3376 | 0.3396 | 0.3366 | 0.3393 | 0.3390 | 0.3385 |
| Phg | 0.4759 | 0.4718 | 0.4794 | 0.4745 | 0.4750 | 0.4758 |
| specific gravity | 3.23 | 2.96 | 3.40 | 2.94 | 2.99 | 3.14 |
| weight loss by acid (%) | 1.78 | 1.82 | 2.03 | 1.87 | 1.97 | 1.87 |

Table 4

|  | 18 | 19 | 20 | 21 | 22 |
|---|---|---|---|---|---|
| $B_2O$ | 57 | 57 | 57 | 57 | 57 |
| PbO | 22 | 25 | 18 | 19 | 17 |
| $Na_2O$ | 7.5 | 7.5 | 7.5 | 7.5 | 7.5 |
| $Al_2O_3$ | 10.5 | 7.5 | 15.5 | 15.5 | 15.5 |
| $TiO_2$ | 3 | — | — | — | — |
| $ZrO_2$ | — | 3 | — | — | — |
| $WO_3$ | — | — | 2 | — | — |
| $Sb_2O_3$ | — | — | — | 1 | — |
| $Tl_2O$ | — | — | — | — | 3 |
| $\eta d$ | 1.67042 | 1.69300 | 1.63552 | 1.63467 | 1.63554 |
| $\nu d$ | 35.49 | 35.36 | 39.43 | 39.75 | 38.43 |
| PcA' | 0.3245 | 0.3250 | 0.3310 | 0.3317 | 0.3297 |
| Phg | 0.5056 | 0.5010 | 0.4930 | 0.4915 | 0.4942 |
| specific gravity | 3.60 | — | — | — | — |
| weight loss by acid (%) | 2.71 | — | — | — | — |

Table 5

|  | 23 | 24 | 25 | 26 |
|---|---|---|---|---|
| $B_2O_3$ | 57 | 57 | 57 | 57 |
| PbO | 5 | 15 | 25 | 25 |
| $Na_2O$ | — | — | — | — |
| 2NaF | 7.5 | 7.5 | 7.5 | 7.5 |
| $Al_2O_3$ | 17.5 | 17.5 | 6.5 | 1.5 |
| $2AlF_3$ | — | — | 4 | 9 |
| $SiO_2$ | 5 | — | — | — |
| CaO | 8 | 3 | — | — |
| $\eta d$ | 1.54950 | 1.60229 | 1.6575 | 1.6543 |
| $\nu d$ | 53.71 | 44.35 | 37.4 | 38.0 |
| PcA' | 0.3509 | 0.3380 | 0.327 | 0.328 |

| | | | | -continued | |
|---|---|---|---|---|---|
| Phg | 0.4555 | 0.4786 | 0.498 | 0.496 | |
| specific gravity | 2.59 | 3.11 | 3.76 | 3.81 | |
| weight loss by acid (%) | 2.40 | 2.62 | 2.62 | 2.03 | |
| F/O ion ratio | 0.061 | 0.062 | 0.181 | 0.344 | |

The relationship between νd and PcA' of each of glass specimens (1–26) is shown in FIG. 1, in which dots 1–26, which correspond to glass specimens (1–26) exist on the left side of line A which shows the relationship between νd and PcA' of a normal dispersion glass. This means that the glasses of this invention have the anomaly of the partial dispersion ratio in the long wave length region.

Figure 2:
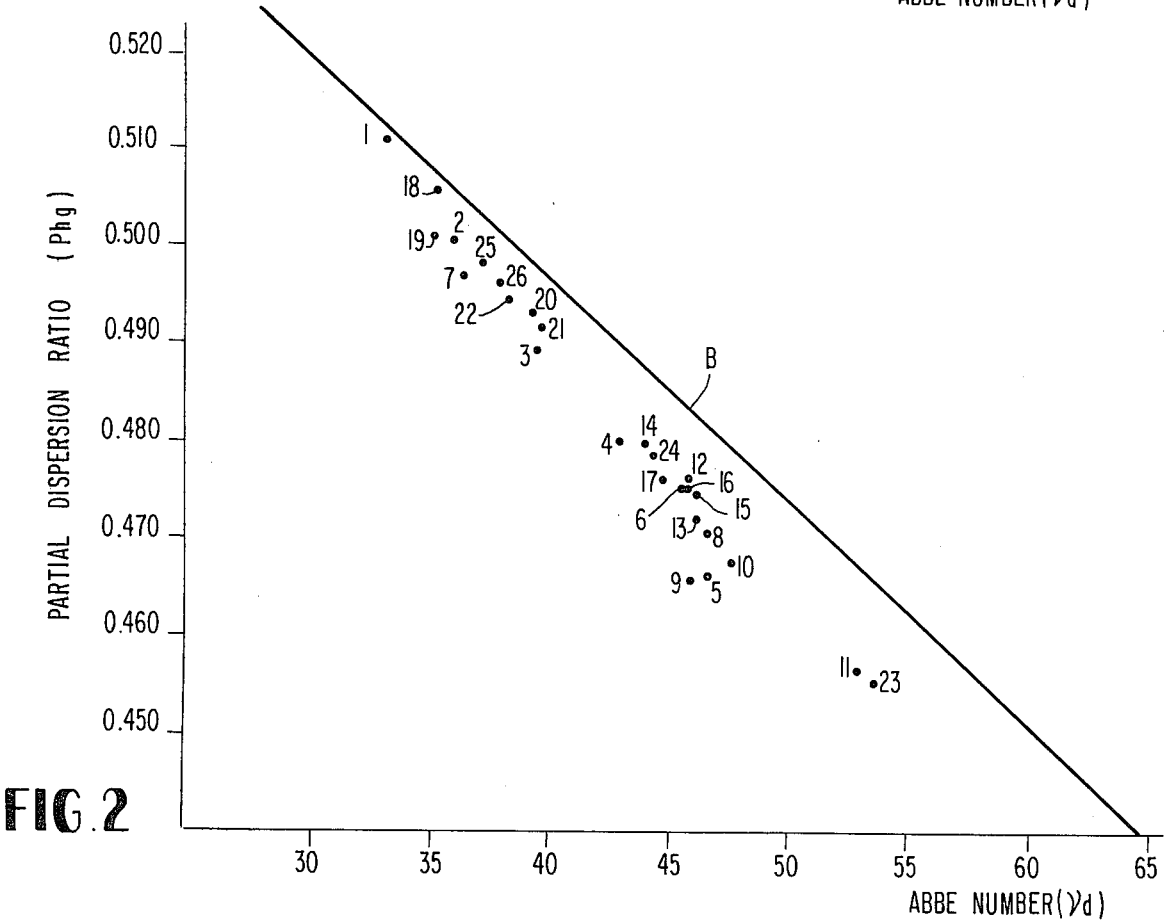
FIG. 2 shows the relationship between the Abbe number ($\nu d$) and the partial dispersing ratio (Phg) of a glass of his invention showing that the Phg value of this glass in the short wave length region is smaller than that of the general normal dispersion glass.

The relationship between νd and Phg of each of glass samples (1–26) is shown in FIG. 2, in which dots 1–26 corresponding to glass samples (1–26) exist on the left side of line B, which shows the relationship between νd and Phg of a normal dispersion glass. This means that the partial dispersion ratio of the glass of this invention in the short wave length region is smaller than that of a normal dispersion glass.

For example, glass specimen 10 listed in Table 2 was produced in the following manner. A mixture composed of $H_3BO_3$ 86.0 g, $Na_2CO_3$ 7.2 g, $Al(OH)_3$ 33.9 g, PbO 8.9 g, $Pb(NO_3)_2$ 7.4 g, $SiO_2$ 3.0 g and $CaCO_3$ 14.9 g was prepared. 100 g of this mixture was blended well and melted in a Pt crucible (120 cc volume) open to the atmosphere at 1350° C for about 1 hour and 30 minutes. The resultant melt was poured in a metal mold, and cooled slowly from the transition temperature of the glass (550° C) to the room temperature (cooling rate about 25° C/hr.).

The glass obtained was reheated to its transition temperature (550° C) and kept at that temperature for 10 hours, slowly cooled down to 450° C with a cooling velocity of about 10° C/hr. and further cooled to room temperature. Specimen 10 having the composition and the optical properties described in Table 2 was thus produced.

The other specimens were produced in a similar manner.

FIGS. 3a to 7b show that the presence of $Na_2O$ in the glass composition is critical and provides an excellent effect in the anomaly of partial dispersing properties. In these figures, 7 glass compositions are compared to determine the effect of $Na_2O$ on the optical properties of the glass. The results clearly show that $Na_2O$ provides a superior and unexpectedly remarkable anomalous partial dispersion glass in the long wave length region.

More particularly, in order to show the criticality of the presence of $Na_2O$ in the glass composition to provide an excellent effect in the anomaly of partial dispersing property, we have compared the following compositions and obtained the following results:

| Substitution of $SiO_2$ to $Na_2O$ Composition (mol%) | Data | | | | | | |
|---|---|---|---|---|---|---|---|
| | (1) | (2) | (3) | (4) | (5) | (6) | (7) |
| $B_2O_3$ | 70 | 70 | 70 | 50 | 50 | 50 | 50 |
| $SiO_2$ | 5 | 3 | 0 | 15 | 10 | 5 | 0 |
| $Na_2O$ | 0 | 2 | 5 | 5 | 10 | 15 | 20 |
| $Al_2O_3$ | 12.5 | 12.5 | 12.5 | 20 | 20 | 20 | 20 |
| PbO | 12.5 | 12.5 | 12.5 | 10 | 10 | 10 | 10 |
| Optical Property | | | | | | | |
| Nd | 1.58310 | 1.58275 | 1.58240 | 1.57125 | 1.56820 | 1.56511 | 1.56223 |
| Vd | 46.82 | 46.68 | 46.52 | 48.57 | 47.59 | 46.63 | 45.64 |
| PcA' | 0.3430 | 0.3432 | 0.3435 | 0.3384 | 0.3386 | 0.3388 | 0.3390 |
| Δ PcA' | +0.0106 | +0.0109 | +0.0114 | +0.0041 | +0.0053 | +0.0066 | +0.0078 |

Explanation of Figures

From FIG. 3-a and FIG. 3-b, it is apparent that ηd value decreases by the substitution of $SiO_2$ to $Na_2O$. As a result, $νd = ηd - 1/η_{F-ηc}$ also decreases (FIGS. 4-a and 4-b).

On the other hand, PcA' value is constant or slightly increased (FIGS. 5-a and 5-b).

As a result, from FIG. 6 showing νd-PcA' relationship, it is apparent that the partial dispersion ratio (PcA') becomes larger. This is also apparent from FIGS. 7-a and 7-b.

Thus, the above data and figures show that $Na_2O$ provides more advantageous results in anomalous partially dispersing property in the long wave length region.

In order to illustrate the improvements of the present inventin wherein $Na_2O$ is employed in an anomalous dispersion glass mainly comprising $B_2O_3$, PbO and $A_2O_3$, compositions have been prepared and tested as tabulated in Table 6.

Table 6

| | 1 | 2 | 3 | 4 | 5 | 6 | 7 | 8 |
|---|---|---|---|---|---|---|---|---|
| $B_2O_3$ | 60 mol% | 57.5 | 55 | 52.5 | 50 | 59 | 57 | 55 |
| PbO | 25 | 25 | 25 | 25 | 25 | 26 | 28 | 30 |
| $Na_2O$ | 7.5 | 10 | 12.5 | 15 | 17.5 | 7.5 | 7.5 | 7.5 |
| $Al_2O_3$ | 7.5 | 7.5 | 7.5 | 7.5 | 7.5 | 7.5 | 7.5 | 7.5 |
| ηd | 1.67320 | 1.67297 | 1.67273 | 1.67252 | 1.67229 | — | — | — |
| νd | 36.47 | 35.50 | 34.52 | 33.55 | 32.60 | 35.72 | 34.22 | 37.72 |
| PCA' | 0.3262 | 0.3245 | 0.3233 | 0.3217 | 0.3207 | 0.3240 | 0.3213 | 0.3190 |
| ΔPCA' | 0.0050 | 0.0043 | 0.0042 | 0.0037 | 0.0037 | 0.0036 | 0.0025 | 0.0019 |
| Da | 2.78 | 2.47 | 2.10 | 1.86 | 1.58 | — | — | — |

In Table 6 specimen 1 corresponds to specimen 7 of Table 2 hereinabove. Modifications of the composition of specimen 1 are made in the compositions of specimens 2 through 8. In specimens 2 through 5, a portion of $B_2O_3$ is substituted by $Na_2O$ while in specimens 6 to 8, a portion of $B_2O_3$ is substituted by PbO for comparison.

Figure 9:
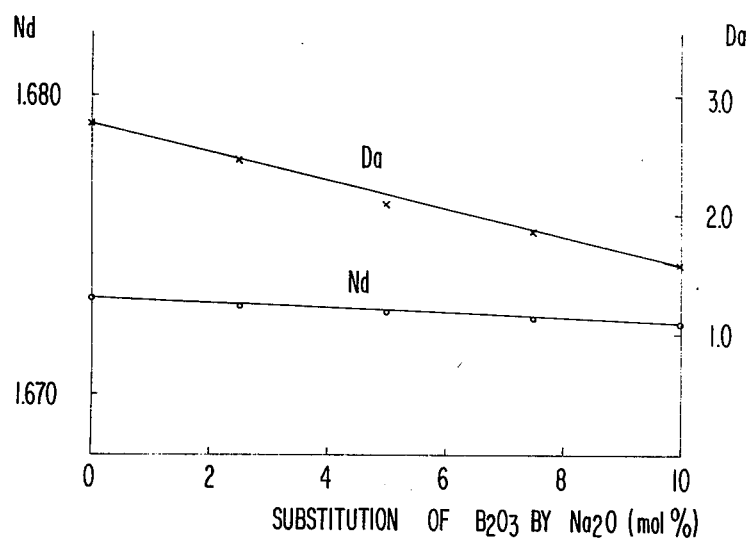
Figure 10:
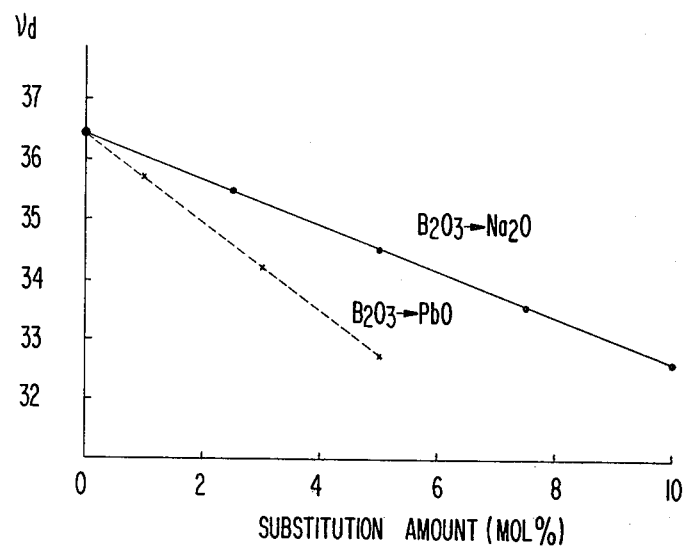

From FIG. 9, it is apparent that due to the substitution of $B_2O_3$ by $Na_2O$ the acid proof property Da is improved and $\nu d$ tends to decrease. Moreover, in FIG. 10, the reduction behavior of $\nu d$ is illustrated. Accordingly, since the reduction of $\nu d$ follows the reduction of $P_{CA'}$ due to the reduction of $B_2O_3$, the resulting glasses with difficulty approach the normal line in the relationship of $\nu d$ and $P_{CA'}$.

On the other hand, in case of the glasses obtained by the substitution of $B_2O_3$ by PbO, PbO more effectively affects the reduction of $\nu d$ than $Na_2O$, but due to the fact that the reduction of $P_{CA'}$ is larger than that of the former case, such glasses tend to easily approach the normal line.

Figure 11:
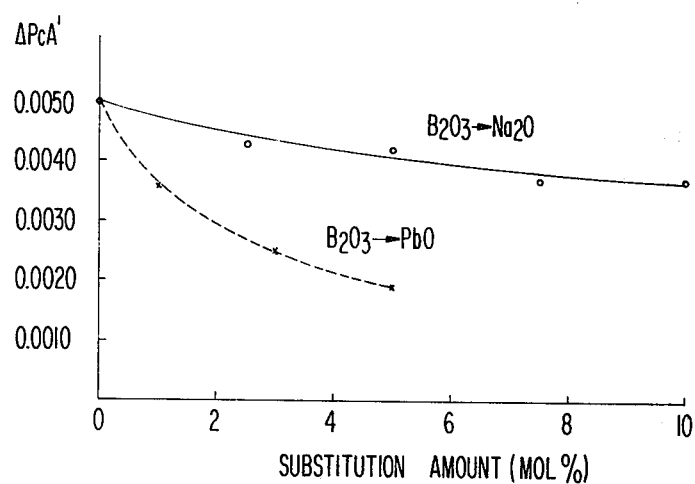

That is, as is apparent from FIG. 11, $Na_2O$ is more effective than PbO for the purpose of reducing as small as possible the deviation $\Delta P_{CA'}$ from the normal line.

Figure 8:
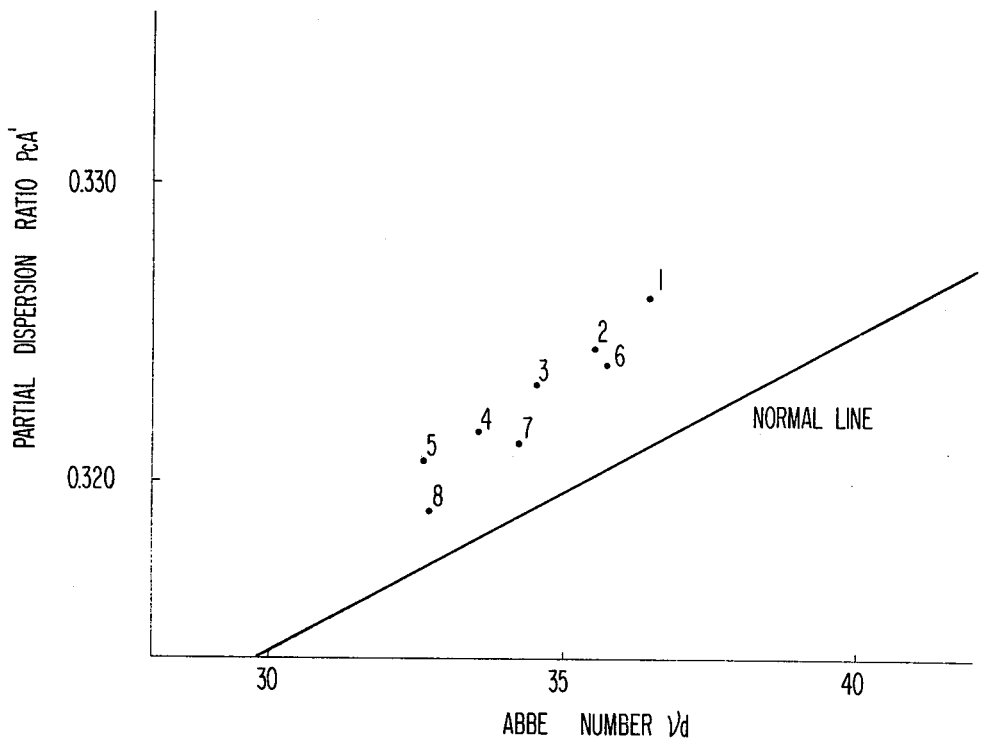
FIGS. 8, 9, 10 and 11 relate to the glass composition of Table 6.

FIG. 8 plots Abbe number against partial dispersion ratio for specimens of Table 6, while FIG. 11 plots amount of $Na_2O$ or PbO substituted for $B_2O_3$ against $\Delta P_{CA'}$ for the specimens of Table 6.

Glass compositions have been prepared and tested as set forth in Table 7 to illustrate differences in properties between an anomalous dispersion glass not containing $Na_2O$ and the same glass containing 2.5 mol.% $Na_2O$ with corresponding decrease in B and $B_2O_3$ content. $\Delta P_{CA'}$ is less with the glass of this invention.

Table 7

|          | 9       | 10      |
|----------|---------|---------|
| $B_2O_3$ | 65      | 67.5    |
| PbO      | 25      | 25      |
| $Na_2O$  | 2.5     | 0       |
| $Al_2O_3$| 7.5     | 7.5     |
| $\eta d$ | 1.67448 | 1.67560 |
| $\nu d$  | 39.55   | 41.20   |
| PCA'     | 0.3328  | 0.3364  |
| $\Delta$PCA' | 0.0084 | 0.0102 |
| Da       | 3.66    | 4.60    |

As particularly described above with respect to the Tables and the drawings, the glass of this invention has a high anomalous partial dispersion property in the long wave length region and is suitable for the production of a super achromatic lens used in optical instruments.

While the invention has been described in detail and with reference to specific embodiments thereof, it will be apparent to one skilled in the art that various changes and modifications can be made therein without departing from the spirit and scope thereof.

What is claimed:

1. An anomalous dispersion glass exhibiting an $\eta d$ value of 1.54–1.71 $\nu d$ value of 55–30 and the remarkable anomaly of the partial dispersing property in the long wave length region, which contains $B_2O_3$ 45–70 mol%, PbO 5–30 mol%, $Na_2O$ 1–15 mol%, $SiO_2$ 0–10 mol%, $Al_2O_3$ 5–25 mol%, one or more components selected from the group consisting of CaO, BaO, MgO and CdO 0–16 mol%, and any one component selected from the group consisting of $TiO_2$, $ZrO_2$, $Sb_2O_3$ $WO_3$ and $Tl_2O$ 0–3 mol%, wherein F ion may be added to said oxide mixture in such amount that the F/O ion ratio in the resulting glass lies in a range of 0–0.35.

2. An anomalous dispersion glass as claimed in claim 1, which consists of 53–57 mol% of $B_2O_3$, 5–29 mol% of PbO, 3.5–7.5 mol% of $Na_2O$, 10.5–17.5 mol% of $Al_2O_3$ and 0–4 mol% of $SiO_2$.

3. An anomalous dispersion glass as claimed in claim 1, which, as an additional ingredient contains 1–12 mol% of CaO.

4. In a process for producing an anomalous dispersion glass comprising mainly $B_2O_3$, PbO and $Al_2O_3$, the improvement which comprises introducing 1–15 mol% of $Na_2O$ into said glass while maintaining the amount of $B_2O_3$ at 45–70 mol% and the amount of PbO at 5–30 mol%.

5. The method of claim 4 wherein there is also added to said glass $SiO_2$ 0–10 mol%, $Al_2O_3$ 5–25 mol%, one or more components selected from the group consisting of CaO, BaO, MgO and CdO 0–16 mol%, and any one component selected from the group consisting of $TiO_2$, $ZrO_2$, $Sb_2O_3$, $WO_3$ and $Tl_2O$ 0–3 mol%, wherein F ion may be added to said oxide mixture in such amount that the F/O ion ratio in the resulting glass lies in a range of 0–0.35.

6. The method of claim 4 wherein 3.5–7.5 mol% of $Na_2O$ is employed with 53–57 mol% of $B_2O_3$, 5–29 mol% of PbO, 10.5–17.5 mol% of $Al_2O_3$ and 0–4 mol% of $SiO_2$.

7. The method of claim 4 wherein 1–12 mol% of CaO is also added to said glass composition.

* * * * *